Patented Oct. 23, 1928.

1,689,029

UNITED STATES PATENT OFFICE.

WILBERT A. HEYMAN, OF NEW YORK, N. Y.

CHOCOLATE MILK COMPOSITION.

No Drawing. Application filed May 4, 1927. Serial No. 188,872.

This invention relates to a new and improved food or beverage product, more particularly to a product wherein cocoa is an essential element, and one of the objects of the invention is to provide a product of the above character which will have a better flavor than has obtained in similar products hitherto produced.

Another object of the invention is to produce a product of the above character, which is more soluble, more readily digestible and which has better keeping qualities than has obtained in like products hitherto produced.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

In the production of my improved product, I first mix together cocoa powder and water. I preferably employ cocoa powder having a very low percentage of fat, say cocoa having not over ten percent fat content. I add to this mixture a quantity of neutralizing agent, preferably bi-carbonate of soda, although other similar reactive neutralizing agents may be employed. In adding this neutralizing agent, I preferably use a sufficient quantity thereof to give the mixture a slight alkaline reaction to the litmus paper test. I then heat the mixture to a temperature ranging from 160° F. to 212° F. The purpose of this heating is to break up the starch cells of the cocoa powder. Before heating the mixture, I sometimes add a small percentage of gelatine or other agents capable of neutralizing the tannin of the cocoa. The heating of this mixture with the alkali present, also has the effect of making the cellulose content of the cocoa more soluble, and therefore more easily digestible. After heating, this mixture is then put through a homogenizing apparatus, the purpose of which is to break up the fat cells of the cocoa to colloidalize the mixture and to emulsify the starch. I then add to this mixture a lacteal substance which may be in the form of whole or skimmed milk or whole or skimmed milk powder, and thoroughly mix the same. I then heat this resultant mixture to either a temperature ranging from 140° F. to 160° F. to pasteurize it, or I may heat it to a temperature of 240° F. in order to sterilize the liquid. The liquid is then put through a drying apparatus to remove the water content and form a powder. To this powder I add a sweetening substance, preferably powdered cane sugar. If desired, the sugar may be mixed with the liquid before it is put through the drying apparatus.

I preferably provide quantities of cocoa and the lacteal fluid, so that the finally dried compound without the sweetener will consist of about from five to fifty percent of cocoa constituents and from ninety-five to fifty per cent of milk solids. When the sweetener is added, the resultant mixture will consist of approximately fifty-five percent of the sweetener and forty-five percent of the combined cocoa and milk solids, the latter, of course, containing a small amount of water, say three percent.

As many changes could be made in this construction without departing from the scope of the following claims, it is intended that all matter contained in the above description, shall be interpreted as illustrative only and not in a limiting sense.

Having thus described my invention, what I claim as new, and desire to secure by Letters Patent, is:—

1. A soluble food or beverage product in powdered form, consisting of acid neutralized cocoa having a low fat content, the latter having its starch cells broken up, and milk solids.

2. A soluble food product in powdered form, consisting of homogeneously distributed cocoa constituents in which the acid content has been neutralized and the starch cells broken up, milk solids and sugar.

3. A soluble food product consisting of homogeneously distributed cocoa constituents, an acid neutralizing agent, a tannin neutralizing agent and said cocoa constituent having its starch cells broken up, milk solids and sugar.

4. A soluble food or beverage product containing acid and tannin neutralized cocoa powder, milk solids and sugar.

5. A soluble food product containing acid and tannin neutralized cocoa, milk solids and sugar in substantially the following proportions: 45% of combined cocoa and milk solids, and 55% of sugar.

6. A soluble food product consisting of acid and tanin neutralized cocoa powder, milk solids and sugar, the cocoa and milk constituents ranging from 5 to 50% of the former and from 95 to 50% of the latter, the final mixture consisting of approximately 45% of cocoa and milk constituents and approximately 55% of sugar.

In testimony whereof, I affix hereto my signature.

WILBERT A. HEYMAN.